United States Patent Office 2,969,847
Patented Jan. 31, 1961

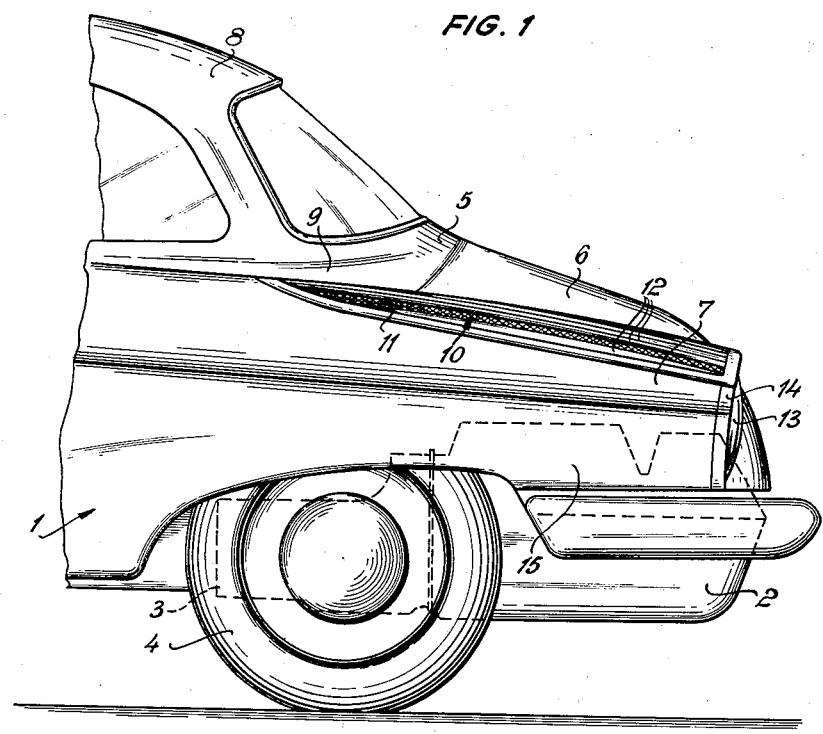
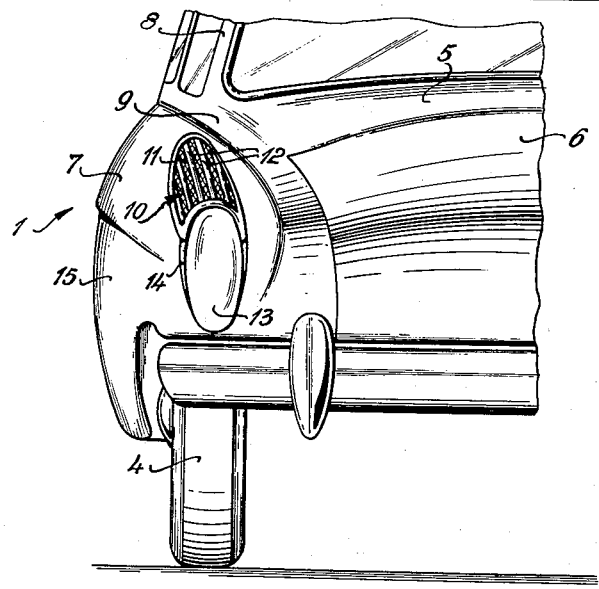

2,969,847

COOLING-AIR GUIDE SYSTEM FOR MOTOR VEHICLES

Erwin Komenda, Stuttgart, and Konrad Bamberg, Stuttgart-Zuffenhausen, Germany, assignors to Dr. Ing. h.c. F. Porsche K.G., Stuttgart-Zuffenhausen, Germany Filed Mar. 25, 1958, Ser. No. 723,678

Claims priority, application Germany Apr. 20, 1957

2 Claims. (Cl. 180—54)

The present invention relates to a cooling-air system, and more particularly to a cooling-air guide system for motor vehicles having an air-cooled internal combustion engine whereby one or several apertures for the cooling-air inlet which are covered with gratings or screens are provided in the vehicle outer body wall.

The prior art is replete with different proposals which are concerned with the construction and arrangement of the inlet apertures for the cooling air. However, difficulties arise, in particular with vehicles provided with an internal combustion engine disposed in the rear thereof, to arrange the air inlet apertures in such a manner that the streamlined shape and contour of the vehicle is not interrupted or disturbed.

In some prior art constructions, the apertures are located, for example, in the covering lid or hood for the engine compartment. In other prior art constructions, a projection is provided in the lateral body wall ahead of the rear fender into which are placed the cooling-air inlet apertures.

The present invention aims at an arrangement and construction of unobtrusive and inconspicuous cooling-air inlet apertures which do not impair or affect adversely the general configuration of the outer body wall of the vehicle, and essentially consists in that, with a vehicle having lateral body wall portions projecting beyond the central body part and surrounding or enclosing at least partially the vehicle wheels, the crest or top portion of these lateral body wall portions are constructed as air inlet apertures which are covered by a correspondingly constructed decorative screen adapted to and following the contour and shape of the outer body wall.

The cooling-air inlet aperture at the fender portions in accordance with the present invention does not interrupt any of the aerodynamically favorable streamlined surfaces of the vehicle outer body wall and, therefore, does not disturb the same since it is adapted to and follows the body contour in an excellent manner. The cooling inlet apertures in accordance with the present invention extend essentially from the end of the lateral body wall portions up to the region of the transition of the end part into the roof part. The decorative screen covering the cooling-air inlet apertures thereby passes over at the end of the lateral body wall portions directly into the shield covering the light-assembly for the motor vehicle whereby it may form itself a part of the shield for the light assembly of the motor vehicle.

Accordingly, it is an object of the present invention to provide an arrangement and construction of the cooling-air inlet apertures for a motor vehicle having an air-cooled internal combustion engine which obviates the disadvantages of the prior art constructions.

It is another object of the present invention to provide an arrangement and construction for the cooling-air inlet apertures which does not impair the pleasing appearance of the vehicle design and which in particular does not impair or interrupt those body wall surfaces which have significance by reason of the streamlined contour thereof imparting aerodynamically favorable characteristics thereto.

It is still another object of the present invention to provide cooling-air inlet apertures in the lateral rear body wall portions of the vehicle which are relatively inconspicuous yet provide a highly efficient and effective flow of cooling air to the rear engine to adequately cool the same under all driving conditions.

A further object of the present invention resides in the provision of a decorative screen for each cooling-air inlet aperture which simultaneously serves as shield or screen for the light assembly normally found in the end portions of the vehicle.

These and other objects, features and advantages will become more obvious from the following description when taken in connection with the accompanying drawing which shows, for purposes of illustration only, one embodiment in accordance with the present invention, and wherein:

Figure 1 is a partial side view of the rear part of a motor vehicle provided with cooling-air inlet apertures in accordance with the present invention; and Figure 2 is a rear end view of the motor vehicle of Figure 1.

Referring now to the drawing wherein like reference numerals are used in the two views thereof to designate like parts, reference numeral 1 designates therein a motor vehicle provided with an air-cooled internal combustion engine 2 which is accommodated in the rear of the vehicle 1. The engine 2 drives the rear wheels 4 of the vehicle over a change-speed transmission, not shown in detail and disposed within transmission housing 3. The internal combustion engine 2 is accessible by means of a hood or lid 6 provided in the outer body wall 5 of the vehicle 1.

The vehicle outer body wall 5 is also provided with a bulge-like lateral body wall portion 7 within the region of the wheels 4 on each side of the vehicle whereby each bulge-like lateral body wall portion 7 begins essentially at the transition of the roof part 8 into the rear part 9 of the outer body wall and extends up to the vehicle rear end with an essentially constant height. The upper surface or top ridge portion of each lateral body wall portion 7 is constructed as cooling-air inlet aperture 10 for the cooling air of the internal combustion engine 2 which aperture 10 preferably extends over the entire length of the lateral body wall portion 7. The duct means leading from the cooling-air inlet aperture 10 to the engine 2 is formed between the upper part of the lateral body wall portion 7 and the wheel casings. Each aperture 10 is covered by a decorative screen 11. For purposes of improving the over-all appearance of the vehicle, the decorative screen 11 is provided with rods 12 extending essentially in the longitudinal direction of the vehicle which emphasize the streamlined form of the vehicle, particularly of the rear portion thereof.

The light assemblies or illuminating devices 13 for the motor vehicle 1 which may include, for example, the tail light, stop light, turn indicator light, back-up light, etc., are arranged at the rear end of each lateral body wall portion 7 whereby the light assemblies or illuminating devices 13 are set into the respective lateral body wall portion 7. The rear end of the decorative screen thereby forms simultaneously a part of the shield for light-assembly insert.

Furthermore, the present invention offers the possibility to simultaneously construct the cooling-air inlet apertures, for instance, as separating joint for detachable fenders 15 (Figure 1) which are detachably secured at the superstructure, such as frame, chassis or self-supporting body of the motor vehicle and which are constituted predominantly by the lateral body wall portions 7. As a result of such a construction special, separate decorative rods, moldings or the like may be dispensed with for covering the separating joint between fender and the other adjoining vehicle body parts.

While we have shown and described one embodiment in accordance with the present invention, it is understood that the same is not limited thereto but is susceptible of many changes and modifications within the scope and spirit of the present invention, and we, therefore, intend to cover all such changes and modifications as encompassed by the appended claims.

We claim:

1. In a motor vehicle having a plurality of wheels and a body supported thereover, a rear-mounted, air-cooled, internal combustion engine and a cooling-air guide system for said engine, said cooling-air guide system being constructed in the outer body wall means of said vehicle body, said outer body wall means including a central body portion and a laterally-extending body portion on each side of said central body portion, each of said laterally-extending body portions including a portion extending beyond the surface of said central body portion at the rear of said vehicle and having an upper surface, said central body portion including a roof part and at least one end part merging thereinto at the rear of said vehicle, air-inlet aperture means located in each said upper surface, each of said air-inlet aperture means extending essentially from the rearmost end of the respective upper surface to the region of transition between said end part and said roof part, and reinforced decorative screen means covering each of said apertures, said screen means being so constructed and arranged as to correspond to said aperutres and to follow the contour of said outer body wall means.

2. In a motor vehicle as defined in claim 1, further including light means at said rearmost end of each of said laterally-extending body portions and shield means covering said light means, and wherein a portion of each of said screen means forms a part of the corresponding one of said shield means.

References Cited in the file of this patent

UNITED STATES PATENTS

| | | |
|---|---|---|
| 2,050,451 | Nallinger | Aug. 11, 1936 |
| 2,092,040 | Aitken | Sept. 7, 1937 |
| 2,581,072 | Brezek | Jan. 1, 1952 |

FOREIGN PATENTS

| | | |
|---|---|---|
| 957,352 | France | Aug. 22, 1949 |
| 690,318 | Germany | Apr. 22, 1940 |
| 219,479 | Switzerland | May 16, 1942 |